(12) United States Patent
Chalamala et al.

(10) Patent No.: US 8,666,111 B2
(45) Date of Patent: Mar. 4, 2014

(54) SYSTEM AND METHOD FOR DETECTING THE WATERMARK USING DECISION FUSION

(75) Inventors: Srinivasa Rao Chalamala, Hyderabad (IN); Jyoti Dhillon, Hyderabad (IN); Krishna Rao Kakkirala, Hyderabad (IN); Krithika Venkataramani, Hyderabad (IN)

(73) Assignee: Tata Consultancy Services Limited, Mumbai (IN)

( * ) Notice: Subject to any disclaimer, the term of this patent is extended or adjusted under 35 U.S.C. 154(b) by 277 days.

(21) Appl. No.: 13/193,122

(22) Filed: Jul. 28, 2011

(65) Prior Publication Data

US 2012/0300975 A1    Nov. 29, 2012

(30) Foreign Application Priority Data

May 24, 2011    (IN) .......................... 1558/MUM/2011

(51) Int. Cl.
 *G06K 9/00*     (2006.01)
 *G06T 1/00*     (2006.01)

(52) U.S. Cl.
 CPC ......... *G06T 1/005* (2013.01); *G06T 2201/0065* (2013.01)
 USPC ...................................................... 382/100

(58) Field of Classification Search
 USPC ........ 382/100, 232; 380/51, 54, 287; 713/176
 See application file for complete search history.

(56) References Cited

U.S. PATENT DOCUMENTS

| 5,862,260 | A | 1/1999 | Rhoads |
| 6,614,914 | B1 * | 9/2003 | Rhoads et al. ................ 382/100 |
| 2007/0053513 | A1 * | 3/2007 | Hoffberg ....................... 380/201 |
| 2009/0193065 | A1 * | 7/2009 | Vijayarangan et al. ........ 708/209 |

OTHER PUBLICATIONS

Venkataramani, K, et al, "Designing Classifiers for Fusion-Based Biometric Verification," Biometrics: Theory, Methods, and Applications, Chapter 4, 2010, pp. 81-112.*
Venkataramani, K. et al., "Designing Classifiers for Fusion-Based Biometric Verification," *Biometrics: Theory, Methods, and Applications*, Chapter 4, 2010, pp. 81-112.
Venkataramani, K. et at., "Role of Statistical Dependence Between Classifier Scores in Determining the Best Decision Fusion Rule for Improved Biometric Verification," *International Workshop on Multimedia Content Representation, Classification and Security*, 2006, pp. 489-496.

(Continued)

*Primary Examiner* — Amara Abdi
(74) *Attorney, Agent, or Firm* — Oliff PLC

(57) ABSTRACT

The present application provides a robust system and method for detecting the watermark in an electronic media, wherein the electronic media had gone through various kinds of attacks and their combinations thereof which may not be known while detecting the watermarks. The watermark detection system and method can be trained to detect or reject a particular pattern. The watermark detection system and method are based on correlation and are useful in any kind of digital watermarking applications. The watermark detection system and method perform well even when the amount of distortion is not precisely known, wherein the disclosure provides a set of templates or correlation filters, being designed for detection of watermark to cover any kind and combination of attacks. For synchronous attacks, the correlation filter designing is carried out dynamically. Particularly, the template i.e. correlation filter is an attack adaptive frequency domain pattern for watermark detection.

18 Claims, 6 Drawing Sheets

(56) References Cited

OTHER PUBLICATIONS

Venkataramani, K. et al., "OR Rule Fusion of Conditionally Dependent Correlation Filter Based Classifiers for Improved Biometric Verification," *Proc. Of SPIE*, 2006, pp. 62450A-1-62450A-12, vol. 6245.

Venkataramani, K., "Optimal Classifier Ensembles for Improved Biometric Verification," *Ph.D. Dissertation, ECE Department, Carnegie Mellon University*, Jan. 2007.

* cited by examiner

SYSTEM AND METHOD FOR DETECTING THE WATERMARK USING DECISION FUSION

CROSS-REFERENCE TO RELATED APPLICATIONS AND PRIORITY

The present application claims priority to Indian Patent Application No. 1558/MUM/2011, filed on May 24, 2011, the entirety of which is hereby incorporated by reference.

FIELD OF THE INVENTION

The present application relates to a system for identification of nature, type and location of attack or distortion on electronic media signals, and particularly to a watermark detection system for authentication purposes, a detecting method and program robust against several intentional and unintentional watermark elimination and distortion methods in the electronic media signals.

PRIOR-ARTS REFERENCES

1) Krithika Venkataramani and B. V. K. Vijaya Kumar, "Designing classifiers for fusion-based biometric verification," invited chapter in Biometrics: theory, methods and applications, Eds. Boulgouris, Plataniotis, and Micheli-Tzankou, Springer, 2009.
2) Krithika Venkataramani and B. V. K. Vijaya Kumar, "Role of statistical dependence between classifier scores in determining the best decision fusion rule for improved biometric verification," Int. Workshop on Multimedia Content Representation, Classification and Security (MRCS), September 2006.
3) Krithika Venkataramani and B. V. K. Vijaya Kumar, "OR rule fusion of conditionally dependent correlation filter based classifiers for improved biometric verification," Proc. SPIE, Vol. 6245, Orlando, Fla., April 2006.
4) Krithika Venkataramani, Optimal Classifier Ensembles for Improved Biometric Verification, Ph.D. Dissertation, ECE Department, Carnegie Mellon University, January 2007.

BACKGROUND

Digital watermarking is a process for modifying physical or electronic media to embed a machine-readable code into the media, particularly for information security and data access authentication purposes. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by altering the host media signal. Mostly, Random sequences are used as keys to encrypt media signals to be used as watermark during embedding processes.

The reading component analyzes a suspect signal to detect whether a watermark is present. The watermark can only be detected in the suspect signal with the help of a means that compares exactness or near exactness of the embedded watermark. The pirates of media content may try to eliminate the watermark from the media content by manipulating the media signals including audio, video, image, computer readable medium, Compact Disc (CD), hard disk, Floppy drive, and any kind of document, etc.

Hence, a need for precise watermark detection system is identified particularly for commercially distributed content (audio, video, game, etc.), to ascertain type, strength and coverage of manipulation and location of the attack.

Several particular watermarking techniques have been developed. Particular techniques for embedding and detecting imperceptible watermarks in media signals are detailed in the U.S. Pat. Nos. 6,614,914 and 5,862,260 which are hereby incorporated by reference.

However, existence of piracy is clearly a disincentive to the digital distribution of copyrighted works; establishment of responsibility for copies and derivative copies of such works is invaluable. Various forms of multimedia content, whether "master," stereo, NTSC video, HD video, audio tape or compact disc, tolerance of quality degradation will vary with individuals and affect the underlying commercial and aesthetic value of the content. It is desirable to tie copyrights, ownership rights, purchaser information or some combination of these and related data to the content in such a manner that the content must undergo damage, and therefore a reduction in value, with subsequent, unauthorized distribution of the content, whether it is commercial or otherwise.

Hitherto, the methods of encoding and decoding of watermark known in the prior art discussed above are that, the above mentioned prior-arts have proposed typically employs correlation and frequency transform based watermark detection schemes. The digital pirates are largely inclined to use technologically advance cracking methods to defeat the security efforts taken to protect a particular media signal and particularly adopts new and unknown kinds of manipulations or distortions on the electronic media. Traditionally, these intentional distortions can be handled individually by using a template for each type of manipulation. However, when multiple manipulations occur synchronously at multiple sites of the media signals it is difficult to map each type of attack and obviously the combinations of the attack is not known, it is then it is difficult to predict the type and strength of the manipulation and design template for each such attack.

Thus there exists a need to have a robust system and method for detecting the watermark in the electronic media for each possible attacks and combinations thereof, wherein the electronic media had gone through various kinds of intentional distortions, unintentional distortions, geometrical attacks, signal processing and cryptographic attacks and the combinations of the attacks might not be known while detecting the watermarks.

SUMMARY

Before the present systems and methods, enablement are described, it is to be understood that this application is not limited to the particular systems, and methodologies described, as there can be multiple possible embodiments which are not expressly illustrated in the present disclosures. It is also to be understood that the terminology used in the description is for the purpose of describing the particular versions or embodiments only, and is not intended to limit the scope of the present application.

The principal object is to provide a robust system and method for detecting the watermark in the electronic media for each possible attacks and combinations thereof, wherein the electronic media had gone through various kinds of intentional distortions, unintentional distortions, geometrical attacks, signal processing and cryptographic attacks and the combinations of the attacks might not be known while detecting the watermarks.

Another object is to provide a robust system and method for detecting the watermark till the point, where the quality of the electronic media is unacceptable or the electronic media does not have any value after a set of attacks have been operated on that.

Another object is to provide a robust system and method for detecting the watermark can be tuned to any type of attack by properly training the correlation templates.

Yet another object is to provide robust system and method for detecting the watermark, wherein the electronic media had undergone huge amounts of rotation, scaling, and some signal processing operations.

In one aspect, a method for detection of a plurality of attacks on the electronic media signals is implemented by dynamically designing multiple cross correlation filters, each characterized as a template for synchronous detection of watermark in the media signals. The detection of the watermark in the electronic media enables to identify the source of the content piracy effectively.

In another aspect, initially, an object electronic media signals are extracted from the compressed electronic media signals by employing any one of the generally known decompressing means. The electronic media can be any one of the audio, video, image, speech, computer readable medium, Compact Disc (CD), hard disk, Floppy drive, and any kind of document, etc.

Upon extraction of the object media signals, the watermark detection system estimates distortions, generates corresponding templates, evaluate correlation values of each templates and applying score fusion rule for an effective detection of the watermark embedded in the electronic media. The detection subsequently facilitates to identify and trace the source of the content piracy.

In a preferred embodiment, an estimation means of the watermark detection system is adapted to estimate plurality of parameters associated with at least one distortion or attack, wherein the parameters comprises of amount of rotation, size scaling and cropping of the watermarked object media signals.

In a exemplary embodiment, the estimation means further comprising of a feature based image matching algorithm adapted to instantaneously estimate a plurality of features associated with the plurality of synchronous attacks and combinations thereof comprising estimation of amount of rotation, size scaling and cropping and signal processing algorithms adapted to estimate the type and amount of filtering used during the attacks.

The estimation of the attack/distortion and its parameters helps in designing a perfect template/correlation filter by employing a template generation means, wherein the correlation filter is random pattern trained to act against the attacks.

Further, a template generation means of the watermark detection system is adapted to synchronously generate a set of plurality of candidate templates in response to the estimated parameters. Each template is a predictively designed cross correlation filter which corresponds to the estimated possible type and strength of distortion, attacks and combination thereof for an optimal correlation performance. The optimal correlation performance, in one of the embodiments, is referred of at least one template of maximum PSR score amongst the multiple generated templates for detection of the watermark in the watermarked object electronic media signals.

In an exemplary embodiment, the template generation means is adapted to generate the plurality of candidate templates dynamically based on estimation of the plurality of parameters associated with synchronous attacks.

In another exemplary embodiment, the template generation means is adapted to generate the plurality of said candidate templates are generated to configure possible combination of attacks until detection of true positive rate, upon estimation of the plurality of parameters.

Further, the plurality of candidate templates are predictively generated based on estimated characteristic of the attack or distortion resulting in determining the strength of the attack or distortion, each predictively generated template and combination thereof having optimal correlation performance corresponding to the detection of the watermark.

Once the templates are generated, a correlation output determination means of the watermark detection system is adapted to determine a correlation output characterized by a Peak to Side lobe Ratio (PSR) score associated with each successive correlated template for each frame of the said electronic media signal and to derive a maximum PSR score associated with each frame for each candidate templates and to calculate an average maximum PSR score therefor.

In an exemplary embodiment, the correlation output determination means comprises of a score calculator adapted to instantaneously calculate the Peak to Side lobe Ratio (PSR) score associated with each successive correlated template for each frame of the said electronic media signal.

Once the PSR score associated with each candidate template for each said template is calculated, a decision fusion module of the watermark detection system is adapted to facilitate decision of presence of the watermark, compares percentage of maximum PSR scores associated with each frame for each template to commensurate with predefined threshold percentage and alternatively comparing the average of the maximum PSR scores associated with each frame for each template to commensurate with a predefined threshold value thereof.

In a preferred embodiment, the decision fusion module is adapted to instantaneously compare the percentage of processed correlation output scores associated with each frame for each template to commensurate with the predefined threshold percentage and alternatively compare the average of the maximum PSR scores associated with each frame for each template to commensurate with a predefined threshold value thereof, the decision fusion suggesting higher probability of the processed correlation output scores of detection based on percentage of maximum PSR score of each frame of at least one template and average thereof.

Finally, a watermark detection means of the watermark detection system is adapted to detect the watermark, encrypted in each frame of the said electronic media signal, based on at least one or combination of the decision fusion outputs.

Further, the watermark detection means is adapted to detect watermark for plurality of encryption modality of the media signals comprising encryption in a spatial domain, frequency domain, and time domain, etc.

The watermark detection system and method in accordance with this disclosure is based on correlation and it is useful in any kind of digital watermarking applications. The watermark detection system and method in accordance with this disclosure performs well even when the amount of distortion is not exactly known, wherein the present disclosure provides a set of templates or correlation filters can be designed for detection of watermark to cover any kind and combination of attacks. For synchronous attacks, a correlation filter designing is carried out dynamically.

Particularly, the template i.e. correlation filter in accordance with the present disclosure is adapted for frequency domain pattern implementation for watermark detection.

BRIEF DESCRIPTION OF THE DRAWINGS

The foregoing summary, as well as the following detailed description of preferred embodiments, is better understood when read in conjunction with the appended drawings. There is shown in the drawings example embodiments, however, the application is not limited to the specific system and method disclosed in the drawings.

DETAILED DESCRIPTION

Some embodiments, illustrating its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any methods, and systems similar or equivalent to those described herein can be used in the practice or testing of embodiments, the preferred methods, and systems are now described. The disclosed embodiments are merely exemplary.

Definitions:

Watermark:

A watermark is a unique pattern that is added invisibly to the electronic media, wherein the electronic media can be any one of the audio, video, image, speech, computer readable medium, Compact Disc (CD), hard disk, Floppy drive, any kind of document or combination thereof. This unique watermark is used to find the owner of the content since each owner of the electronic media has a unique watermark.

Attack:

An attack is some kind of manipulation on the object electronic media which aims at defeating the watermark detection system.

The present application provides a robust system and method for detecting the watermark in the electronic media for each possible attacks and combinations thereof.

The methods and/or systems by which a watermark is detected are described below. The application discloses a new improvised watermark detection system and method to find the source of the content piracy effectively. The robust watermark detection method consists of five operations: generation of watermark, estimation of distortions, generation of templates, correlation detection and score fusion. Each operation is explained as follows.

Figure 1:
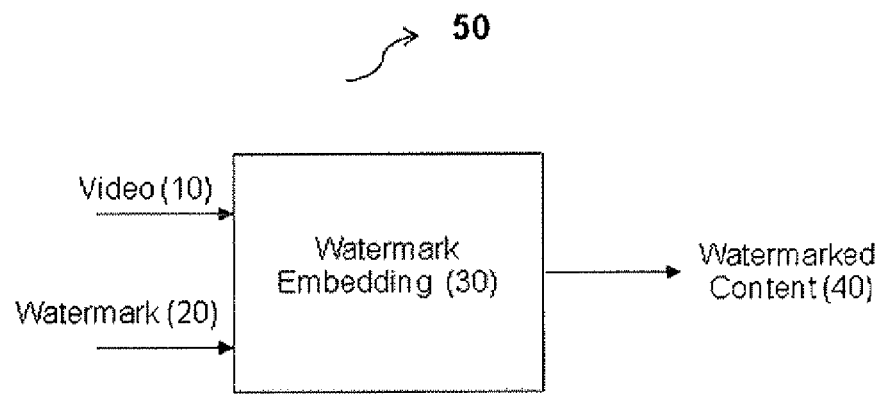
FIG. 1 shows a watermark embedding system.

FIG. 1 shows a watermark embedding system 50. A watermark 20 is generated using a random sequence and unique custom information. The random sequence can be generated from any deterministic random generator 120 (not shown in the figure). For instance, the deterministic random generator 120 generates a random sequence based on Leibniz Pi infinite series which was disclosed in the in the Indian patent application No. 185/MUM/2008, titled "Deterministic Random Number Generators for Information Security and Digital Watermarking", which was filed on Jan. 25, 2008 is hereby incorporated by reference. Additional information is fed as a seed to generate the deterministic random number based on Leibniz Pi infinite series.

Finally the generated random sequence is weighted appropriately to produce the final watermark 20 to be used for embedding/encryption 30 with the object electronic media, wherein the object electronic media can be selected any one of audio, video, image, speech, computer readable medium, Compact Disc (CD), hard disk, Floppy drive, any kind of document or combination thereof. In a preferred embodiment the electronic media is video. Watermark embedding/encryption 30 is a process of modifying the video such that it includes a cryptographically secure watermark which is added in some fashion (spatially or in some other domain) and is not visible to the end user. The watermark embedding 30 can be done by a watermark embedding/encryption means 190 (not shown in the figure) using any of the linear watermark embedding methods. Finally, the watermark embedding/encryption means 190 generates a watermarked video content. Further, a compression means 210 (not shown in the figure) reduces the size of the watermarked video content for distribution by using any one of the suitable compression method.

Figure 2:
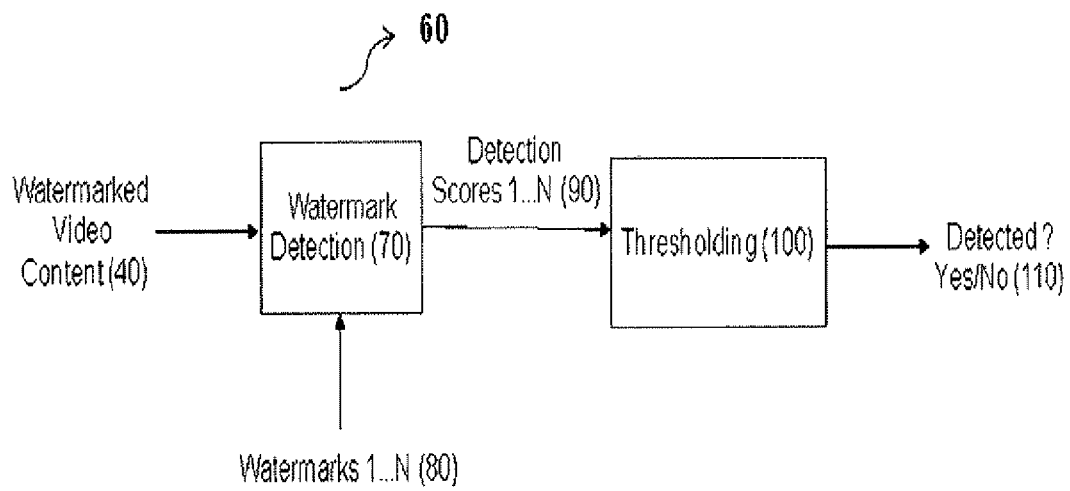
FIG. 2 shows a conventional threshold based watermark detection system.

FIG. 2 shows a conventional threshold based watermark detection system 60. Initially, the compressed watermarked video content can be decompressed to extract the watermarked video content 40 by a decompression means 130 (not shown in the figure). A plurality of generated watermarks 1 through N can be compared with the watermarked video content 40 to generate a plurality scores 1 through N respectively. Then the scores can be compared with the predefined threshold value to determine the status of watermark detection. In this conventional watermark detection system 60, the rate of watermark detection is poor and also the watermark 20 can only be detected with the help of exactly the same watermark 20 embedded with the video content.

Figure 3:
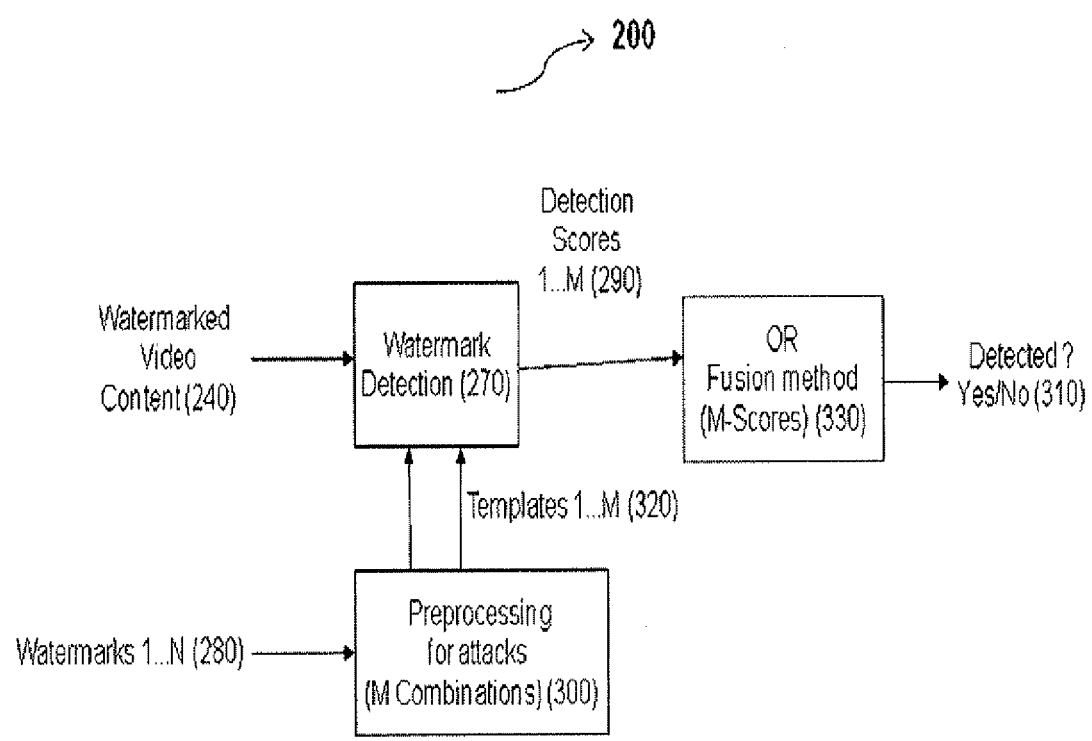
FIG. 3 shows the proposed watermark detection system and method with OR-Rule based decision fusion.

FIG. 3 shows the proposed watermark detection system and method 200 with OR-Rule based decision fusion rule. Initially, the system receives the compressed object media signals, wherein the compressed object media signals is being attacked with at least one type of attack or distortions. The attack that are intended to remove the watermark comprises of geometrical attacks including rotation, scaling, translation, shearing, random bending, and change of aspect ratio, a signal processing attacks including filtering and compression and a cryptographic attacks including key search and oracle attacks. The said object electronic media signal can be any one of the audio, video, image, speech, computer readable medium, Compact Disc (CD), hard disk, Floppy drive, any kind of document or combination thereof. In a preferred embodiment, the object electronic media is video. The decompressing means 130 (not shown in the figure) extracts watermarked video content 240 from the compressed video signals. An estimation means 140 (not shown in the figure) is adapted to instantaneously estimate plurality of parameters associated with at least one distortion or attack. The estimation of the parameters helps in designing a plurality of the templates or plurality of the correlations filters 320 which are used for detecting the watermark in the watermarked video content 240.

The detection method needs to generate an appropriate correlation filter 320 for detecting the watermark in the distorted videos 240. The correlation filter 320 design takes into account the possible distortions that would have happened on the watermarked videos. The detection template or correlation filter 320 is different for different distortions and their range of values. The correlation filter 320 designed for one distortion or attack may not be able to detect watermark in video/image attacked differently.

The estimation of the attack/distortion and its parameters helps in designing a perfect template/correlation filter 320. The estimation means 140 further comprising a feature based image matching algorithm adapted to instantaneously estimate a plurality of features associated with the plurality of synchronous attacks and combinations thereof comprising estimation of amount of rotation, size scaling and cropping, and signal processing algorithm. Once these are estimated, a set of training images/video frames are generated with same kind of distortion occurred on the watermarked video content and used in filter design. In a preferred embodiment, the said rotation is the in-plane spatial rotation of video frame. In a preferred embodiment, the correlation filter is a random pattern trained to act against the attacks.

Figure 4:
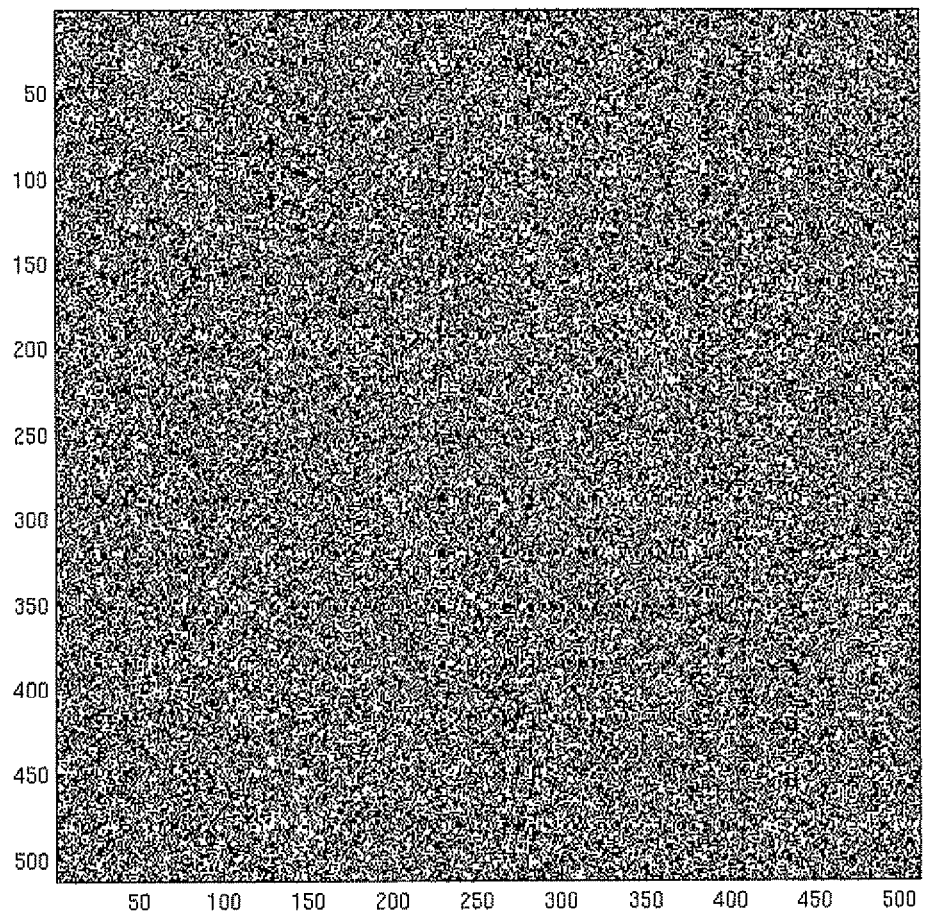
FIG. 4 shows a generated sample template.

A template generation means 150 (not shown in the figure) is adapted to synchronously generate a set of plurality of candidate templates 1 through M 320 in response to the estimated parameters, each template 320 being a predictively designed cross correlation filter according to the estimated possible type and strength of distortion, attacks and combination thereof for an optimal correlation performance of at least one template 320 there from. The generated sample template 320 is shown in the FIG. 4.

In an exemplary embodiment, using the training images and constraining the filter response to the required level, the correlation filter can be designed that can give optimal correlation performance, wherein the training images are the frames extracted from the video, and vary.

In another exemplary embodiment, the template generation means 150 is adapted to generate the plurality of said candidate templates are generated to configure possible combination of attacks until detection of true positive rate, upon estimation of the plurality of parameters.

In a preferred embodiment, given a 2D image an optimal detection template or filter 320 is designed by taking into account the attacks that might have happened on the video to partially of fully eliminate the watermark or to make it difficult for the watermark detection to find a watermark into that video 240. The response of the filter is expected to be maximum i.e. one for watermark and minimum i.e. zero for the un-watermarked images or video frames.

In a preferred embodiment, the inventors used cross correlation to find the similarity response between the test image or video frames and the correlation filter. A correlation output determination means 160 (not shown in the figure) is adapted to determine a correlation output characterized by a Peak to Side lobe Ratio (PSR) score associated with each successive correlated template 320 for each frame of the said electronic media signal and to derive a maximum PSR score associated with each frame for each candidate templates 320 and to calculate an average maximum PSR score therefor.

Figure 5:
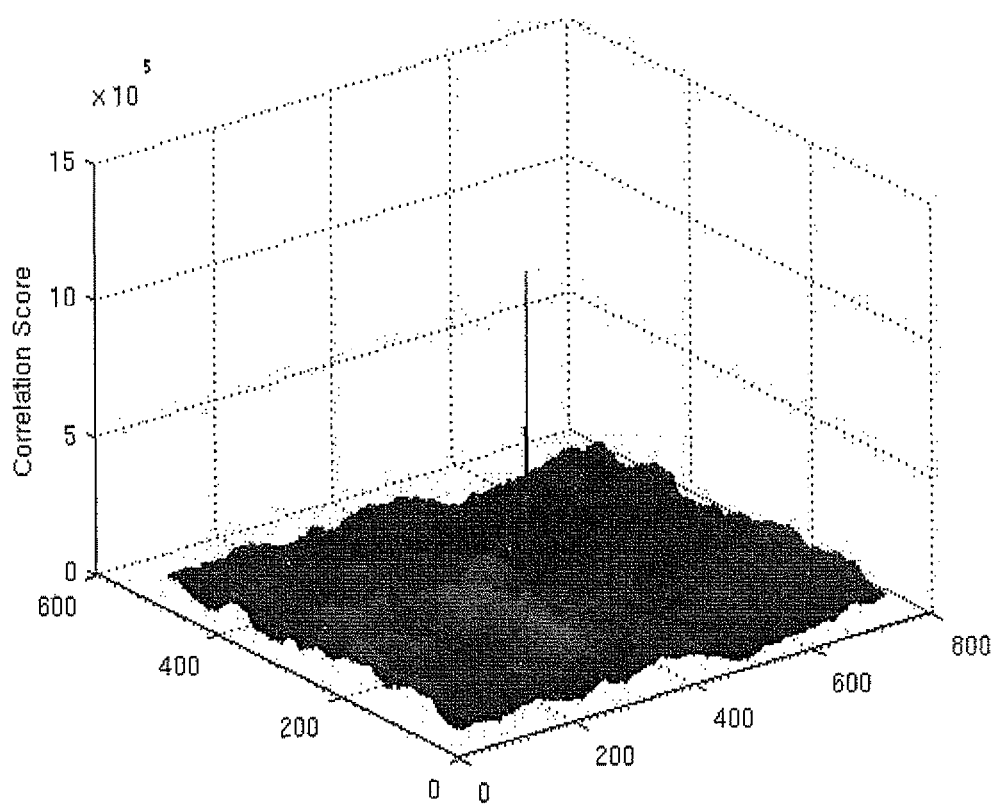
FIG. 5 shows a typical correlation output for watermarked video.
Figure 6:
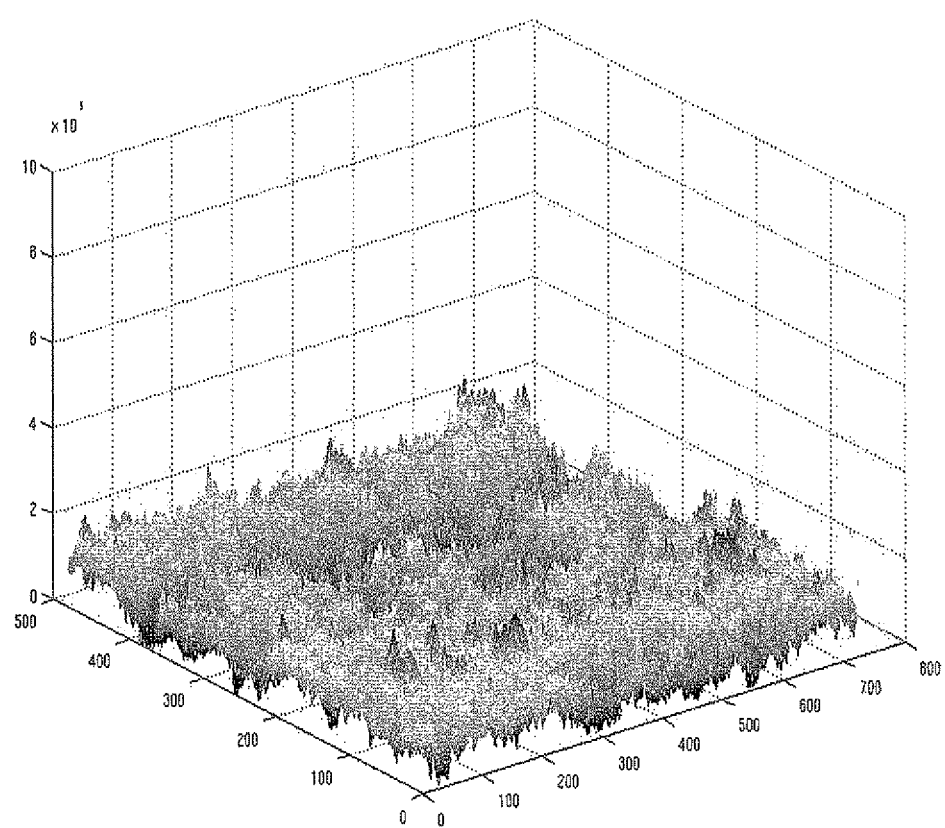
FIG. 6 shows a typical correlation output for unwatermarked or wrongly watermarked video.

In a preferred embodiment, the correlation output is measured to determine whether a watermark 20 is detected or not. A measure called PSR is used to take the decision. If the PSR score is above some threshold which is obtained empirically then the watermark 20 is said to be detected in that image or video. The correlation filter is expected to give clean peaks in the correlation output and a higher PSR score as shown in the FIG. 5. Similarly the correlation output must not show any peak and a very low PSR score below the threshold as shown in the FIG. 6 if an un-watermarked or wrongly watermarked video has been given for testing.

A decision fusion module 170 (not shown in the figure) is adapted to facilitate decision of presence of the watermark, compares percentage of maximum PSR scores associated with each frame for each template 320 to commensurate with predefined threshold percentage and alternatively comparing the average of the maximum PSR scores associated with each frame for each template 320 to commensurate with a predefined threshold value thereof.

In one exemplary embodiment, watermark detection means 180 uses OR fusion rule to detect the watermark in image/single frame and in the entire video by clubbing the individual OR decisions together in some sense for the watermarked video to make the final decision, wherein the clubbing can be done using averaging or by doing Majority voting and comparing with threshold value i.e. if the percentage of frames for which the maximum score is above the threshold (i.e. detected) is more than the predefined value, for e.g. the predefined value is 70% then the watermark is said to be detected else not. The threshold percentage can be configured according to the application.

In one exemplary embodiment, watermark detection means 180 uses Max fusion rule to detect the watermark in image/single frame and the Max Fusion rule results can be combined using averaging the maximum PSR scores of the said frame or the plurality of the frames. It also uses majority voting.

The correlation detection enables to decide whether a watermark 20 is detected or not in the watermarked video content 240. Since the video contains many frames so the detection template 320 must take in to account all the frames in which the watermark 20 is added. Each detection template 320 is designed for single or a combination of watermark manipulation attacks. As there can be a large number of combinations possible, so it is required to generate a template 320 for each combination and correlate them with the attacked watermarked video.

Usually the watermark attacks are not known prior, so it is always required to perform correlation detection with several templates. Correlating detection templates with the possibly attacked watermarked video will result in several scores that have to be combines in some sense to come up with the watermark detection results. The pre-processing of the correlation scores (PSR) before applying the thresholding operation 300 is a critical part of the present disclosure.

The proposed system of the present disclosure particularly focuses on processing the correlation scores of the individual templates 320 generated for different kind of attacks. This processing target improves the performance of the watermark detection by correlation or some other means. This processing tries to combine the detection scores of each template 320 in the set in an optimal way to enhance the detection performance. This is essential due to the following reasons:

The attacks operated on the content are unknown;
The attack strength of each attack is unknown;
Whether a single attack or multiple attacks operated on the watermarked content is unknown; and The combination of attacks and individual strength is also unknown.

When there are multiple attacks happened on the watermarked video 240, since a normal watermark detection system does not know about the type and strength of attack, a template 320 is generated for each attack and its strength. These templates are used for detecting the watermark 20 in the given watermarked video content 240. The single template 320 works well for single attack as well as combination of attacks. When there are multiple attacks even if the system uses several individual templates 320 for detection it may not detect the watermark 20. As the multiple attack scenario leads to infinitely large set of combinations a method of combining the detection results against all these results is required. Our disclosure pertains to using of a decision fusion rule to combine results from different detections. Detection with each template 320 is considered to be a classification task and the classification result says whether the watermark is detected or not.

A watermark detection means 180 (not shown in the figure) is adapted to detect the watermark, encrypted in each frame of the said electronic media signal, based on at least one or combination of the decision fusion outputs. Since the watermark detection rate is more important, and there is a large range of watermark attacks, the OR fusion rule with a set of correlation filter based templates 320 is optimal. This is also the same as the MAX score fusion rule followed by a threshold on the MAX score is optimal. Specifically OR fusion rule works for a single image or independent video frame or a segment of data and also on complete data set by intelligently combining the individual decision results and scores. Similarly MAX score fusion rule works when there are multiple segments/frames/images available of the same data set.

In one exemplary embodiment, the watermark detection means 180 compares the PSR score associated with the each template 320 of the said electronic media signal that results into one classifier per frame, wherein each classifier is configured to detect the watermark in a frame for score commensurating with a predefined threshold value. The OR fusion decision on the decisions of N classifier is authentic if one or more of the classifiers is authentic and impostor if all the classifiers declare impostor. The OR fusion rule in general reduces the False Rejection Rate (FRR) from that of the single classifier and increases the False Acceptance Rate (FAR) from that of an individual classifier. Here the threshold based decision on the PSR score for each template is considered as a classification task.

In an exemplary embodiment, the attacked video may not have same attacks throughout the video but attacks can be different at different segments of the video/data and at different strengths, so the proposed system uses multiple templates and the fusion rules to detect the watermark more accurately in the electronic media signals.

In another embodiment, a method for detection of a plurality of attacks on a plurality of electronic media signals, characterized by a cross correlation based synchronous detection of watermark, the method comprising the various computer implemented steps.

Initial step of the proposed method, object electronic media signals from the compressed electronic media signals are extracted by employing at least one decompressing means 130, wherein the object electronic media comprises of audio, video, image, speech, computer readable medium, Compact Disc (CD), hard disk, Floppy drive, any kind of document or combination thereof. In a preferred embodiment, the object electronic media is video.

In the next step, plurality of parameters associated with at least one distortion or attack are estimated instantaneously, wherein the attacks that are intended to remove the watermark 20 comprises of geometrical attacks including rotation, scaling, translation, shearing, random bending, and change of aspect ratio, a signal processing attacks including filtering and compression and a cryptographic attacks including key search and oracle attacks.

In the next step, a set of plurality of candidate templates of a cross correlation filter 320 predictively designed according to the instantaneously estimated possible type and strength of distortion, attacks and combination thereof are generated synchronously for an optimal correlation performance of at least one template there from and a single detection template 320 which reflects the watermark embedded and the changes occurred on the watermarked content is generated and used for correlation detection.

In the next step, a Peak to Side lobe Ratio (PSR) score successively for each template are obtained to determine a correlation output associated therewith the each template 320.

In the next step, the PSR score associated with the each template 320 for each frame of the said electronic media signal that result into one classifier per frame wherein each classifier is configured to detect the watermark in a frame for score commensurating with a predefined threshold value.

In the next step, an average of the scores of the plurality of the classifiers associated with the plurality of frames of each said template 320 is calculated.

In the next step, at least one fusion rule is applied to compare the averaged classifier score with the predefined threshold value or alternatively evaluate the percentage of maximum classifiers associated with plurality of frames commensurating with the predefined threshold percentage thereof to determine the watermark status in the plurality of frames of the electronic media signal.

In the final step, the presence of watermark 20 is decided alternatively using at least one or combination of fusion rules, for determination of true positive associated with the attack. This watermark detection method is flexible to incorporate the changes the watermarked image or video undergone in to the detection process itself.

The watermark detection accuracy is typically depending on a precise estimation of the amount of rotation and other parameters of the attack. Hence, the correlation filter in the present disclosure is designed to takes into account the range and types of distortions. So the probability of watermark detection is higher if the estimation of the distortion parameters is approximate. The watermark is detected even if there are multiple attacks operated on the media content. The watermark detection performance with multiple detection templates improves when the watermark attacks are unknown. Particularly, the watermark detection performance is improved by employing an OR fusion rule, which provides for combining all the PSR scores of the frames to come up with the detections results.

The watermark detection system and method would be able to detect a watermark till the point where the quality of the document is unacceptable or the document does not have any value after a set of attacks have been operated on that.

The watermark detection system and method uses multiple templates for each possible combination of attacks and its strength when multiple attacks are operated on the electronic media simultaneously.

In the watermark detection system and method, the generation of the number of templates can be reduced by accurately estimating the type of attacks and correctly estimating the strength of each attack, at least for last few attacks.

The present application is described in the example given below which is provided only to illustrate the application and therefore should not be construed to limit the scope of the application.

To evaluate the watermark detection method, multiple watermark attacks that are within the desired tolerance range are applied. In addition, cropping of the video frames between 50-100% and increased compression to a bit-rate of 3.5 Mbps are also applied. For each watermarked video, eight different attack combinations are applied. For evaluating the false alarm rate, each set of watermark templates is used to detect 4 different watermarked videos. This corresponds to evaluating the false alarm rate from 20*4*8=640 videos.

Figure 7:
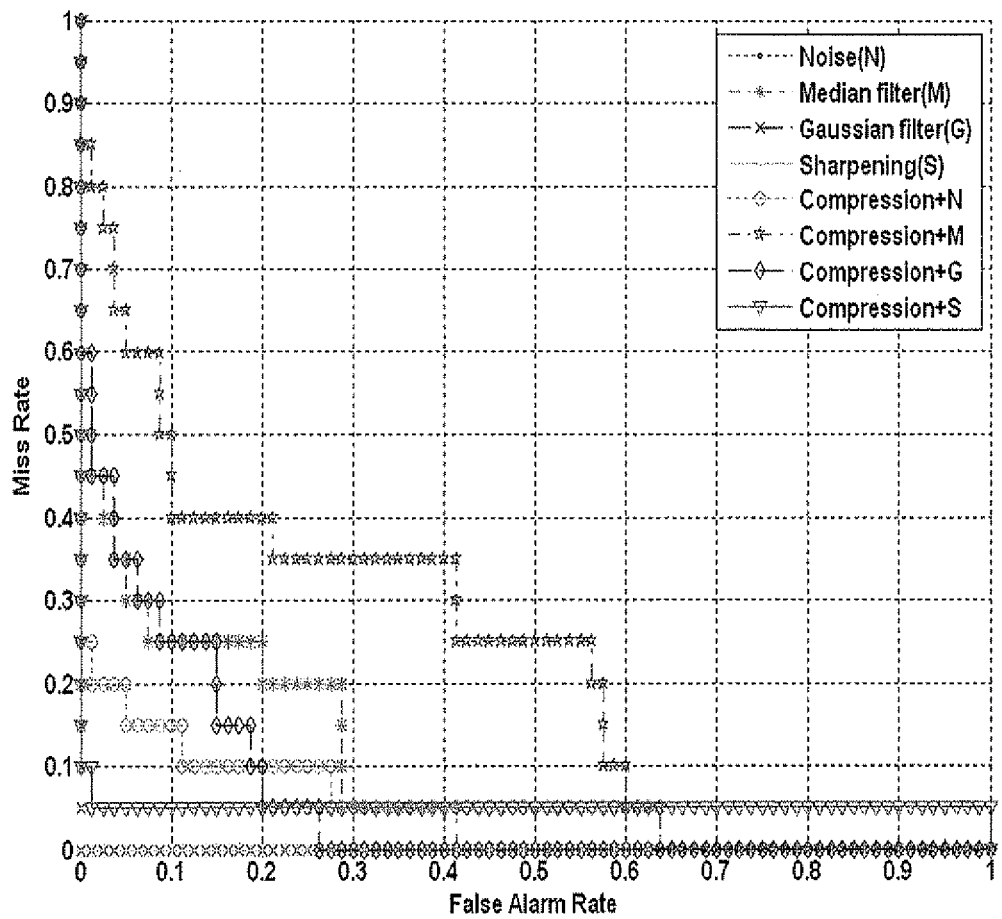
FIG. 7 shows the Receiver operating characteristic (ROC) curves for watermark detection in video for different combinations of multiple attacks.

FIG. 7 shows the Receiver operating characteristic (ROC) curves for the 8 different combinations of multiple attacks. It is observed that if the watermarked video is compressed with the same compression rate as the original un-watermarked video, 100% detection rate is observed for most combinations of multiple attacks. The exception is when median filtering is included as one of the attacks in the combination, where the detection rate is 75% at 10% false alarm rate. The correlation filter templates used are linear, and the non-linear attack by the median filter is more difficult to detect. Even at high compression rates, from the original rate of 8 Mbps to 3.5 Mbps, the watermark detection is good, providing detection rates between 70% and 95% in most cases. As expected, when both median filtering and high compression are included attacks, the detection rate drops to 60% at 10% False Alarm rate.

The watermark detection method is tested against different type of watermark removal attacks such as rotation, scaling, cropping, blurring, additive noise and projective transformation attacks.

The PSR scores of the correlation output are compared against threshold for few attacks and the results as given as follows:

| Attack | Watermark detection status |
| --- | --- |
| Rotation 5 | yes |
| Scaling 120 | yes |
| Rotation 5 + Scaling 120 | yes |
| Median filtering | yes |
| Gaussian filtering | yes |
| Blurring | yes |
| Projective transformation | yes |
| Sharpening | yes |
| Rotation + resize | yes |
| Rotation + resize + median filtering | yes |
| Rotation + resize + median filtering + Noise | yes |
| Rotation + resize + median filtering + Noise + Sharpen | yes |
| Rotation + resize + median filtering + Noise + Sharpen + Crop | yes |
| Rotation + resize + median filtering + Noise + Sharpen + Crop Compression | yes |
| Rotation + resize + Gaussian filtering | yes |
| Rotation + resize + Gaussian filtering + Noise | yes |
| Rotation + resize + Gaussian filtering + Noise + Sharpen | yes |
| Rotation + resize + Gaussian filtering + Noise + Sharpen + Crop | yes |
| Rotation + resize + Gaussian filtering + Noise + Sharpen + Crop Compression | yes |
| Row Removal + Column removal | yes |
| Row Removal + Column removal + Rotation | yes |

Also, the digital watermark method has very low false positive rates.

The methodology and techniques described with respect to the exemplary embodiments can be performed using a machine or other computing device within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The machine may include a processor (e.g., a central processing unit (CPU), a graphics processing unit (GPU, or both), a main memory and a static memory, which communicate with each other via a bus. The machine may further include a video display unit (e.g., a liquid crystal display (LCD), a flat panel, a solid state display, or a cathode ray tube (CRT)). The machine may include an input device (e.g., a keyboard) or touch-sensitive screen, a cursor control device (e.g., a mouse), a disk drive unit, a signal generation device (e.g., a speaker or remote control) and a network interface device.

The disk drive unit may include a machine-readable medium on which is stored one or more sets of instructions (e.g., software) embodying any one or more of the methodologies or functions described herein, including those methods illustrated above. The instructions may also reside, completely or at least partially, within the main memory, the static memory, and/or within the processor during execution thereof by the machine. The main memory and the processor also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions, or that which receives and executes instructions from a propagated signal so that a device connected to a network environment can send or receive voice, video or data, and to communicate over the network using the instructions. The instructions may further be transmitted or received over a network via the network interface device.

While the machine-readable medium can be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: tangible media; solid-state memories such as a memory card or other package that houses one or more read-only (non-volatile) memories, random access memories, or other re-writable (volatile) memories; magneto-optical or optical medium such as a disk or tape; non-transitory mediums or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

The preceding description has been presented with reference to various embodiments. Persons skilled in the art and technology to which this application pertains will appreciate that alterations and changes in the described structures and methods of operation can be practiced without meaningfully departing from the principle and scope.

Although the present application has been shown and described with respect to several preferred embodiments thereof, various changes, omissions and additions to the form and detail thereof, may be made therein, without departing from the spirit and scope of the application.

Advantages

The watermark detection system and method described above finds a number of applications in Information Security and Digital watermarking. Some specific applications where the present disclosure can be implemented include
a) Video on demand;
b) Digital copyrights management; and
c) Multimedia security.

However, the scope of the present disclosure be appreciated in broader sense considering the challenges in protection and security of electronic commercial media.

We claim:

1. A method for detection of a plurality of attacks or distortions on an electronic media signal, the method comprising the computer implemented steps of:
  extracting the electronic media signal from a compressed electronic media signal by employing at least one decompressing means, wherein the electronic media signal comprises one or more frames;
  instantaneously estimating plurality of parameters associated with at least one distortion or attack on the electronic media signal;
  estimating a type and a strength of distortions or attacks occurring simultaneously on the electronic media signal;
  synchronously generating a set of candidate templates for each frame using the plurality of parameters, wherein each candidate template of the set of candidate templates is configured with a predictively designed cross correlation filter;
  obtaining a Peak to Side lobe Ratio (PSR) score for each candidate template;
  obtaining a maximum PSR score from the PSR score associated with each candidate template for each frame of the electronic media signal to obtain a classifier for each frame;
  determining a correlation output between each candidate template and each frame of the electronic media signal based upon the PSR score;
  detecting a watermark for each frame, using the classifier of each frame, when the maximum PSR score commensurates with a predefined threshold value; and
  determining presence of the watermark in the electronic media signal using one or more fusion rules applied on the correlation output of each frame.

2. The method of claim 1, wherein the attacks or distortions comprise geometrical attacks, wherein the geometrical attacks further comprise a rotation, a scaling, a translation, a shearing, a random bending and change of aspect ratio, signal processing attacks comprising filtering and compression and cryptographic attacks comprising key search and oracle attacks.

3. The method of claim 1, wherein the electronic media signal comprises an audio, a video, an image, a speech, a computer readable medium, a Compact Disc (CD), a hard disk, a Floppy drive, and any kind of document or combination thereof.

4. The method of claim 1, wherein the estimation of the parameters is achieved by a feature based image matching algorithm adapted to estimate a plurality of parameters associated with the attacks or distortions, wherein the plurality of features comprises an amount of rotation, size scaling, cropping and a signal processing algorithm adapted to estimate a type and an amount of filtering used during the attacks or distortions.

5. The method of claim 1, wherein upon estimation of the plurality of parameters, the candidate templates are generated to configure possible combination of attacks or distortions until detection of a true positive rate.

6. The method of claim 1, wherein the decision fusion rule for detection of the watermark facilitates low false positive rates of the classifier associated with each candidate template.

7. A system for detection of a plurality of attacks or distortions on an electronic media signal, the system comprising:
at least one decompressing means for extracting the electronic media signal from a compressed electronic media signal wherein the electronic media signal comprises one or more frames;
an estimation means adapted to instantaneously estimate a plurality of parameters associated with at least one distortion or attack on the electronic media signal;
a template generation means configured to
estimate a type and a strength of distortion or attacks occurring simultaneously on the electronic media signal; and
synchronously generate a set of candidate templates using the plurality of parameters, wherein each candidate template of the set of candidate templates is configured with a predictively designed cross correlation filter;
a correlation output determination means configured to
obtain a Peak to Side lobe Ratio (PSR) score for each candidate template;
obtain a maximum PSR score from the PSR score associated with each candidate template for each frame of the electronic media signal to obtain a classifier for each frame;
determine a correlation output between each candidate template and each frame of the electronic media signal based upon the PSR score; and
detect a watermark for each frame, using the classifier of each frame, when the maximum PSR score commensurates with a predefined threshold value; and
a watermark detection means configured to determine presence of the watermark in the electronic media signal using one or more fusion rules applied on the correlation output of each frame.

8. The system of claim 7, wherein the attacks or distortions comprise geometrical attacks, wherein the geometrical attacks further comprise rotation, a scaling, a translation, a shearing, a random bending, and a change of aspect ratio, signal processing attacks comprising filtering and compression and cryptographic attacks comprising key search and oracle attacks.

9. The system of claim 7, wherein the electronic media signal comprises an audio, a video, an image, a speech, a computer readable medium, a Compact Disc (CD), a hard disk, a Floppy drive, and any kind of document or combination thereof.

10. The system of claim 7, wherein the estimation means further comprises a feature based image matching algorithm adapted to estimate a plurality of parameters associated with the attacks or distortions, wherein the plurality of features comprises an amount of rotation, size scaling and cropping and a signal processing algorithm adapted to estimate a type and an amount of filtering used during the attacks or distortions.

11. The system of claim 7, wherein the correlation output determination means further comprises a score calculator adapted to instantaneously calculate a Peak to Side lobe Ratio (PSR) score associated with each candidate template for each frame of the electronic media signal.

12. The system of claim 7, wherein the decision fusion module provides a higher probability of detection of the watermark based on the correlation output.

13. The system of claim 7, wherein the predictively designed cross correlation filter comprises Random binary pattern trained to counter different attacks or distortions.

14. The system of claim 7, wherein the watermark detection means is adapted to detect the watermark for a plurality of encryption modality of the electronic media signals comprising encryption in a spatial domain, a frequency domain, and a time domain.

15. The method of claim 1, further comprising applying at least one fusion rule for comparing a percentage of frames having the maximum PSR score associated with each frame for each candidate template to commensurate with a predefined threshold percentage.

16. The method of claim 1, further comprising applying at least one fusion rule for comparing an average of the maximum PSR scores associated with each frame for each candidate template to commensurate with the predefined threshold value thereof.

17. The system of claim 7, further comprising a decision fusion module configured to apply at least one fusion rule for comparing a percentage of frames having the maximum PSR score associated with each frame for each candidate template to commensurate with a predefined threshold percentage.

18. The system of claim 7, further comprising a decision fusion module configured to apply at least one fusion rule for comparing an average of the maximum PSR scores associated with each frame for each candidate template to commensurate with the predefined threshold value thereof.

* * * * *